G. D. POWELL.
AGRICULTURAL IMPLEMENT.
APPLICATION FILED APR. 30, 1918.

1,279,432.

Patented Sept. 17, 1918.

INVENTOR
George D. Powell,

WITNESSES
R. W. Hoagland
V. B. Hillyard.

BY
Richard B. Owen.

ATTORNEY

UNITED STATES PATENT OFFICE.

GEORGE DIETZ POWELL, OF DETROIT, TEXAS.

AGRICULTURAL IMPLEMENT.

1,279,432.   Specification of Letters Patent.   Patented Sept. 17, 1918.

Application filed April 30, 1918.   Serial No. 231,617.

*To all whom it may concern:*

Be it known that I, GEORGE D. POWELL, a citizen of the United States, residing at Detroit, in the county of Red River and State of Texas, have invented certain new and useful Improvements in Agricultural Implements, of which the following is a specification.

The invention relates to agricultural implements, and more particularly to the class designed for tilling the soil and preparing the same for planting after it has been plowed.

The invention relates to implements for reducing clods, loosening the soil, leveling the surface and otherwise preparing the ground for reception of the seed.

The invention consists of an implement of the harrow variety embodying a frame and yielding teeth pivoted thereto, said frame comprising a plurality of transversely spaced longitudinal bars and cross rods connecting the bars and forming supporting means for the teeth which are pivotally mounted thereon and for the springs co-acting with the teeth to yieldingly hold them in operative position, the said springs further serving as spacing means for the longitudinal bars.

The drawing illustrates a preferred embodiment of the invention. However, it is to be understood that in adapting the same to meet different conditions, various changes in the form, proportion, and minor details of construction may be resorted to without departing from the nature of the invention as claimed hereinafter.

In the drawings:—

Corresponding and like parts are referred to in the following description and indicated in the several views of the drawings by like reference characters.

The implement comprises a frame which, as illustrated, comprises a plurality of longitudinally disposed bars 1 and a number of cross rods 2 connecting such bars and forming supporting means for the teeth and the springs coöperating therewith. It is to be noted that the bars 1 may be of any formation and provided in any number depending upon the capacity of the implement. The cross rods 2 are headed at one end, and are threaded for a short distance at the opposite end to receive nuts 7. The bars 1 are preferably loose upon the rods 2 so as to admit of varying the space between them by proper manipulation of the nuts 7.

Figure 2:
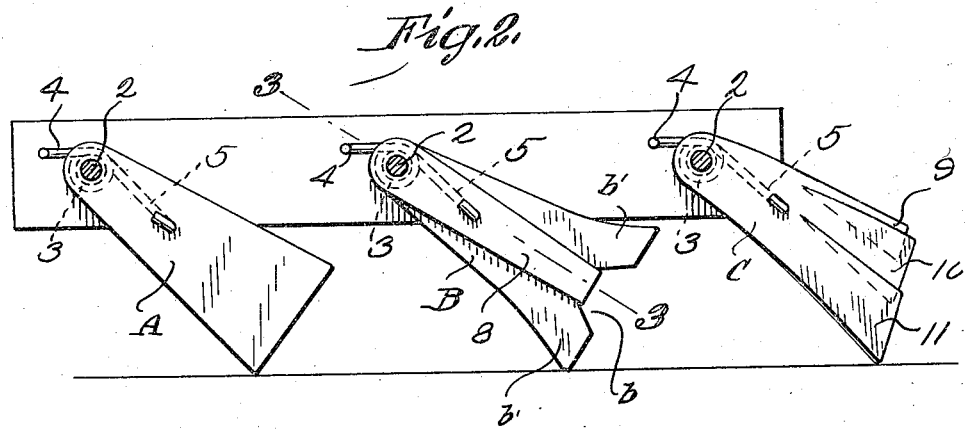
Fig. 2 is a vertical longitudinal section on the line 2—2 of Fig. 1.
Figure 3:
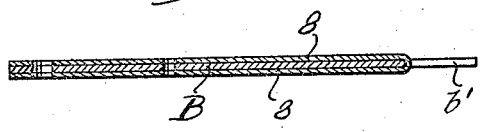
Fig. 3 is a sectional detail of one of the teeth on the line 3—3 of Fig. 2.

A plurality of teeth are mounted upon the rods 2 in a manner to pivot thereon. The teeth, as indicated, are provided in sets which are designated respectively by the reference letters A, B, and C. Each of the teeth presents a tapering outline in side view as indicated most clearly in Fig. 2. Each of the teeth A consists of a flat plate which is apertured at its smaller end to receive the forward rod 2. The teeth incline, and at the lower rear ends present two corners or points either of which is adapted to act directly upon the soil.

The teeth B resemble somewhat in outline the teeth A with the exception of the rear portion which flares and has its lower rear end notched as indicated at $b$, the parts $b^1$ upon opposite sides of the notch $b$ constituting points which act directly upon the soil when the implement is in operation. Reinforcing members 8 are disposed at the sides of the body of the tooth and consist of a strip of metal folded upon itself midway of its ends, the fold entering the notch $b$, and the ends being apertured to coincide with the opening in the end of the tooth B to receive the cross rod. In this manner, the tooth B may be constructed of relatively thin material because of the stiffening and reinforcing action of the members 8 at the sides thereof.

The teeth C are of suitable width at their rear end and are formed with a plurality of longitudinally disposed slits so as to form a number of wings 9 and 10, and 11. These wings are bent laterally as indicated most clearly in Fig. 1 so as to cover the track of the implement and insure every part of the ground being acted upon. As illustrated most clearly in Fig. 1, the wings may be uniformly or differently bent according to the result to be attained.

The teeth of each set have openings at their pivot ends to receive the rod 2 upon which they are mounted and other openings a short distance from their pivot ends to receive the bent ends of the springs coöperating therewith. When the points of the teeth become worn, such teeth may be reversed thereby bringing the remaining points in working position. This may be effected by reversing the travel of the implement as will be readily understood.

Figure 1:
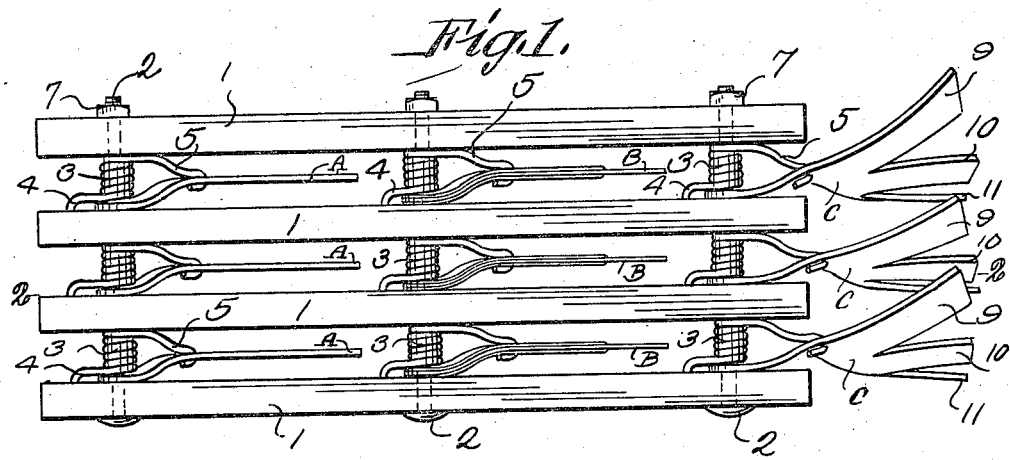
Figure 1 is a top plan view of a harrow embodying the invention.

A coil spring 3 is provided for each of the teeth to co-act therewith, and this spring is mounted upon the cross rod pivotally supporting the tooth. One end of each of the springs 3 is extended as indicated at 4 and is connected in any manner with the adjacent longitudinal bar. The opposite end of the spring 3 is extended as indicated at 5, and is connected with the tooth by passing through an opening formed therein and having its end bent. While the springs 3 are illustrated in Fig. 1 as being closed, i. e. with their convolutions in contact, it is to be understood that such convolutions may stand apart to admit of their being pressed together by turning the nuts 7 upon the threaded ends of the rods 2 so as to vary the width between the longitudinal bars 1. In Fig. 1 the springs 3 are shown closed, the nuts 7 having been turned on the threaded ends of the rods 2 to their limit. By varying the nuts 7, the springs will open and press the bars 1 apart to a greater or less extent depending upon the relative position of the nuts 7 on the rods 2. After the soil has been plowed the implement is drawn thereover to break up the clods, loosen the earth, and level the soil thereby preparing the ground for receiving the seed. By having the teeth pivotally mounted and yieldably held to the work they are adapted to give when meeting a stone or other unyielding object thereby preventing injury thereto which would otherwise disable the same.

What I claim is:

1. An implement of the character specified, comprising teeth pivoted and normally inclined to the vertical and presenting two working points at their rear ends, and springs co-acting with the teeth to yieldably hold either one of the points thereof in working position.

2. An implement of the nature set forth, comprising a plurality of tapered teeth pivotally mounted and normally inclined to the vertical, and having two working points at their ends, and springs mounted axially with the teeth and to yieldably hold the latter with either point in working condition.

3. An implement of the character specified, a tooth, a medially disposed reinforcing member at the sides of the tooth and in contact therewith, said reinforcing members constituting parts of a single element which is folded upon itself to embrace opposite sides of the tooth.

4. In an implement of the character set forth, a flat tapered tooth flared at its wide end and notched to provide spaced working points, and medially disposed reinforcing members at the sides of the tooth comprising parts of a single element which is folded upon itself with the folded end seated in the notch of the tooth and its folded portion embracing opposite sides of the tooth and in contact therewith.

In testimony whereof I affix my signature in presence of two witnesses.

GEORGE DIETZ POWELL.

Witnesses:
R. J. PARNELL,
H. R. OWNLY.

Copies of this patent may be obtained for five cents each, by addressing the "Commissioner of Patents, Washington, D. C."